2,857,329

DRILLING MUD

Paul W. Fischer, Whittier, and Raymond A. Rogers, Fullerton, Calif., assignors to Union Oil Company of California, Los Angeles, Calif., a corporation of California No Drawing. Continuation of application Serial No. 428,820, May 10, 1954, which is a division of application Serial No. 720,304, January 4, 1947, now Patent No. 2,679,478, dated May 25, 1954. This application October 29, 1956, Serial No. 618,668

8 Claims. (Cl. 252—8.5)

This invention relates to the treatment of drilling fluids such as are employed in the drilling of oil and gas wells. This is a continuation of our copending application Serial No. 428,820 filed May 10, 1954 (now abandoned), which is in turn a division of our application Serial No. 720,304, filed January 4, 1947, and issued May 25, 1954, as U. S. Patent 2,679,478.

In general a drilling fluid particularly that employed for rotary drilling operations, which is also termed a "drilling mud" or simply "a mud," is a colloidal suspension of a suspending agent such as bentonite or other suitable clays in water to which other materials such as barium sulfate may be added in order to increase its apparent specific gravity. The physical characteristics of these clay suspensions are largely determined by the properties of the individual clay particles, most important of which are size, shape and surface characteristics.

Until recently it has been considered that the principal functions of a mud in drilling operations are threefold: it should form a cake on the wall of the hole; it should retain in suspension the cuttings formed so that the latter may be removed from the hole along with the mud; and it should possess sufficient weight to overcome any pressure encountered during drilling. These functions are considered in more detail below.

One of the primary difficulties encountered in the drilling of wells is that due to the sloughing or caving into the hole of the formations penetrated. The use of a drilling mud is supposed to lessen the tendency for caving by "mudding-off" the formations, that is, forming a cake on the walls of the hole. It is recognized, however, that drilling fluids prepared from natural clays vary widely in their ability to prevent sloughing of formations and that those fluids which form a thin gelatinous cake on the walls of the hole and have a minimum tendency to lose water to the surrounding formations are the most desirable.

In order for drilling to proceed smoothly, means must be provided for continuously removing the cuttings from the hole and to this end drilling mud is circulated through the hole. The mud must be of sufficiently low viscosity to allow it to be readily pumped and it should be thixotropic. Thixotropy is that property of colloidal suspension which involves an increase in gel strength as a function of the time of quiescent standing. This property is valuable in that it prevents, to a large extent, the sedimentation of the cuttings in the hole during periods of suspended circulation. However, immediately after violent agitation, such as is induced by the circulation of the mud, cuttings will settle a short distance and this fact is utilized for their removal in a settling tank provided for the purpose and in which the degree of agitation is suddenly lowered to practically zero. Normally, a mud which has proper wall building characteristics and is pumpable will have adequate thixotropic properties.

Obviously, the total weight of a mud must be sufficiently great to prevent blow-outs from any high pressure formations that may be encountered, but beyond this point, the need for greater weight is problematical. A rapid reduction in the hydrostatic head maintained on formations, caused by a reduction in the specific weight of the mud or by permitting the level of the mud in the well to fall while removing the drilling tools from the hole may cause dangerous caving. Therefore, mud is usually pumped into the well while removing the drill string in order to maintain a substantially constant hydrostatic head on the formations being drilled and the mud gravity is always kept as constant as practical. In general, the practice has been to keep the weight of mud only sufficiently high to prevent blow-outs. It is common practice to increase the specific gravity of a mud by adding finely ground insoluble materials of high density, such as for example, barium sulfate, iron oxide, etc. Because of their insolubility, the usual weighting agents employed have little effect on the performance characteristics of a mud.

Of the various characteristics of a drilling mud, the most important is its tendency to lose water to the formation. It has been found that the structural strengths of most formations which are penetrated during drilling are sufficient to prevent the walls of the hole from caving, but that many such formations are weakened from being saturated or even partially saturated with water. Frequently such action causes sloughing of the formation into the hole with a resultant seizing of the drill pipe or tools so that they cannot be removed and costly fishing jobs result. It is, therefore, of the greatest importance to prevent loss of water from the drilling mud to the formations drilled. The ideal drilling fluid should permit very little if any loss of water to the formation and should deposit only a relatively thin mud cake on the walls of the hole.

As has been mentioned hereinabove, the most important physical characteristic of a drilling mud is its ability to form a thin impervious cake on the walls of the hole thereby sealing formations against infiltration of water. The terms cake-forming and water-loss properties, sealing properties and, as will be brought out hereinbelow, filtration characteristics or filter rate are used synonymously throughout this specification to denote this characteristic.

A measure of the tendency for a mud to lose water to the formations being drilled and to form a thin impervious cake upon the wall of the hole can be obtained by means of a simple filtration test. In fact, the sealing properties of the mud are almost entirely dependent upon the character of the mud-cake formed when the latter is pressed against a membrane or filter permeable to water and are very largely independent of the character of the membrane or filter employed. As a consequence, the "filtration rate" of a mud becomes of prime importance in determining the quality of the mud.

The procedure for determining filtration rate is described in "Recommended Practice on Standard Field Procedure for Testing Drilling Fuids," A. P. I. Code No. 29, second edition, published July 1942, page 11, and consists in measuring the total volume of filtrate water obtained during a given time interval of pressure filtration. The amount of filtrate obtained in the first five minutes of filtration can be used as an indication of the relative quality of various muds. A more accurate evaluation is obtained from the volume of filtrate collected in the first fifteen minutes of filtration. An even better procedure is to determine the total volume of filtrate in the first hour of filtration. Numerous correlations between such tests and actual drilling experience with the same muds have shown that the muds yielding a total filtrate of less than 30 ml. in the first hour's filtration period are usually very satisfactory. On the other hand, muds yielding a total filtrate in excess of 45 ml. under similar circumstances have been found dangerous to use, particularly when drilling through formations which are readily softened by penetration of water, as cave-ins are liable to occur. Under some circumstances, particularly when drilling surface formations, or formations at moderate depth, the permissible maximum filtration rate of the mud may be as high as about 55 ml. of total filtrate in the first hour of filtration. A mud which yields a total filtrate of 30 ml. in the first hour's filtration period will yield about 7 ml. of filtrate in the first five minutes and about 15 ml. of filtrate in the first fifteen minutes of filtration. Similarly a mud which yields a filtrate of 45 ml. in the first hour of filtration will give approximately 11 ml. in the first five minutes and about 22 ml. in the first fifteen minutes of filtration. A mud which is satisfactory for drilling operations will under the conditions of this test, deposit a filter cake of not over one-quarter inch preferably one-eighth inch, in thickness and of a soft, plastic or gelatinous texture, whereas muds exhibiting unsatisfactory filter rates tend to deposit a thick, tough mud cake. Normally, as has already been mentioned hereinabove, muds possessing acceptable filtering characteristics form good mud cakes and, therefore, in practice only the "filtering rate" is ordinarily observed.

From the foregoing, it may be concluded that in preparing or treating a drilling mud in order to endow it with properties which will tend to insure satisfactory performance in the field, it is desirable that the treated mud when tested, as above described, yield a total filtrate of not over 55 ml. in the first hour of filtration, and preferably less than 30 ml. of filtrate, and that the deposited cake be preferably less than one-eighth inch in thickness and of a soft gelatinous texture.

As has already been mentioned hereinabove, a mud in order to be usable, must be capable of being readily and easily circulated by means of the pump which is ordinarily employed for the purpose in the field. From a practical standpoint, it has been found that within certain limits the more readily the mud can be circulated, the faster will drilling proceed. With many muds it has been observed that if their Marsh funnel viscosities, as determined by the 500 ml. in and 500 ml. out method, is in excess of 55 seconds they may exhibit impaired circulation rates with presently used equipment. On the other hand, it has now been observed that certain materials when added to control water loss may result in muds having viscosities in excess of 55 seconds but which are readily pumpable in actual practice.

In so far as the drilling operation and the subsequent production rate are concerned the most important characteristic of a drilling mud is its filtering rate and the viscosity of the mud need only be such that it is pumpable. Throughout this specification and the claims, wherever the terms "viscosity," "Marsh viscosity," "apparent viscosity" or "funnel viscosity" are employed, they relate to the viscosity as determined by means of the above test, a description of which can be found in "Recommended Practice on Standard Field Procedure for Testing Drilling Fuids," A. P. I. Code No. 29, second edition, published July 1942, page 6, except that 500 ml. of mud is measured into the funnel and the time determined for the 500 ml. to run out.

It is, therefore, one of the objects of this invention to provide for a treatment of a drilling mud which will cause the latter to have a "filtration rate" of less than approximately 45 ml. and at most not more than 55 ml. in the first hour of filtration, said treated mud having a viscosity sufficiently low so that it is pumpable. When the viscosity of the mud is sufficiently low to permit it to be readily circulated and the filtration rate is within the limits described hereinabove, the mud will ordinarily possess sufficient thixotropic properties for all practical purposes.

It should be emphasized that, as might be expected, naturally occurring clays and the muds prepared from them vary considerably in character. For example, they differ in ultimate chemical composition, in amounts and types of colloidal material, and in amounts and types of impurities. Furthermore, the common contaminants which may become included in the mud during its use in drilling operations, namely calcium hydroxide leached from cement, and gypsum, differ in type, one being a fairly strong base and the other a neutral salt. As a consequence and in view of the complex character of colloidal dispersions, it is only logical to expect that in general the performance characteristics of muds prepared from clays of different origins or even of the same mud contaminated with different materials, will not necessarily be affected in exactly the same manner by the addition of any given treating agent. In spite of these variations it has been found that the treating agents disclosed herein when added in proper amount will control the performance characteristics of various muds within acceptable limits.

The methods employed for making performance tests have been outlined in detail above. In determining the effect of a treating agent or agents on a mud, the procedure employed in the laboratory has been to add the desired amount of treating agent or agents to the mud followed by a thorough agitation of the mixture for one hour prior to the conducting of the performance tests. It will be observed that such a procedure completely eliminates any necessity for making a chemical analysis of the mud and, as a consequence, it has been found to be the most practical method which can be employed in the field.

The "sulfonic acids of relatively high molecular weight" employed to prepare the oil-soluble alkali metal and ammonium salts of this invention may be those synthetically produced or those obtained from the treatment of petroleum fractions. The latter are formed when lubricating oil fractions or similar petroleum fractions are treated with concentrated or fuming sulfuric acid. The so-called "mahogany acids" dissolve in the oil phase, whereas the so-called "green acids" are the water-soluble organic acids which pass into the sludge. After separation of the sludge the "mahogany acids" which are preferred may be recovered in the form of sodium salts by treatment of the acid-treated oil with sodium hydroxide to produce the sodium sulfonates which are then subsequently removed from the oil solution by extraction with alcohol. The other alkali metal salts and the ammonium salts may be obtained from the above sodium salts by well known processes of metathesis. An example of a commercially available oil-soluble alkali metal salt of a higher molecular weight sulfonic acid is a concentrate in lubricating oil, comprising about 60% sodium sulfonates and 40% lubricating oil, which is known as "Petronate" and marketed by L. Sonneborn Sons, Inc., of New York city.

Desirably, but not necessarily, the treating agent selected from the group comprising the alkali metal and ammonium salts of oil-soluble sulfonic acids, may be dispersed in a petroleum or other hydrocarbon oil such as spray oil, a transformer oil extract produced by Edeleanu extraction of a suitable petroleum distillate with sulfur dioxide, a light lubricating oil or even a heavy lubricating oil, prior to introduction into the drilling fluid. The effect of these petroleum hydrocarbons upon performance characteristics of the drilling fluid is shown in several ways. The light hydrocarbons of the kerosene range to the spray oil range are shown to have a marked tendency to reduce the foaming character of soap containing drilling fluids. At the same time, these drilling fluids containing these lighter hydrocarbons show relatively little improvement in water loss to formation as may be indicated by test. The inclusion, however, of the hydrocarbons of the extract type such as Edeleanu extraction product obtained in the refining of lubricating oils or other such processes, have a marked tendency to reduce the water loss to formation of the compounded drilling fluid. In addition such materials as crude oil or asphaltenes might be stabilized in the drilling mud to give equally as favorable results. It is also of importance that major proportions of these extract materials contained in the drilling muds can be stabilized in drilling fluids with the aid of the previously described soaps to result in an emulsion of soap, hydrocarbon, suspending agent, and water of which extremely small amounts of water are lost to the formation.

In the usual field operations, it is often necessary to form a cement plug in the hole and to subsequently drill through this plug, thereby contaminating the mud with cement. Mud which has been contaminated with cement is termed "cement-cut mud." It has been observed that such muds usually possess poor performance characteristics in accordance with the quality definitions given hereinabove and that the greater the contamination the poorer the quality. Cement-cut muds often become so viscous in character that it is difficult, and often impossible to circulate the contaminated material. This increase in apparent viscosity may impart "gas cutting tendencies" to the muds, that is, prevent the escape of gas from the mud, and tend to prevent the proper release of cuttings therefrom. Further, as will be discussed more fully later, such muds form thick, pervious cakes upon the wall of the hole which permit the ready penetration of water into the formation.

In the past when drilling muds have become contaminated or, in any event, when their apparent viscosities have become undesirably high, it has frequently been the practice to remove the mud from the hole and to dispose of it as useless material. Such practice involved a considerable disposal problem and, furthermore, it entailed considerable expense for the purchase of new mud. It has been the practice in some fields to lower the viscosity of cement-cut muds by the addition of water. In the past this has been highly undesirable inasmuch as such muds normally exhibited excessively high filter rates.

Muds reclaimed by means of chemical treatment, unless properly controlled, will not be of high quality nor will they alleviate the difficulties encountered from the caving of formations. The reason for this is that a treatment which merely controls the viscosity of the mud is insufficient unless attention has also been given to the cake-forming and water-loss properties of the mud and their importance.

It has now been found that drilling muds can be treated with certain reagents which will control both the viscosity and the filtration rate of the mud and that it is possible to add the reagents to the mud either after the contamination has taken place or, in those cases where it is known or expected that the mud is going to be contaminated by undesirable materials, such as for example, when it is anticipated that a cement plug will be drilled through and that the mud will then become contaminated with cement, the reagents can be added to the mud prior to said contamination. This latter type of treatment immunizes the mud against any substantial deterioration in its performance characteristics upon subsequent admixing with the contaminating material, and in some cases it has been found that such contamination after the addition of the reagents which have now been discovered even improves the performance characteristics of the mud. Furthermore, these reagents are so effective in controlling water loss that the viscosity if desired can be controlled merely by the addition of water to the mud either before or after contamination with the cement or similar materials. Illustrative of this point, it has been observed that when mud becomes contaminated with cement its viscosity and filtration rate becomes undesirably high, but that these factors can be reduced to desirable values by the addition to the contaminated mud of a mixture of Petronate, methyl cellulose and water. On the other hand, by adding the mixture of Petronate, methyl cellulose and water to the mud prior to contamination with cement, the performance characteristics of the mud are improved, and upon the subsequent addition of cement the performance characteristics are still acceptable and in many cases may remain substantially unchanged or may even be improved.

It is desirable in practicing this invention to improve the performance characteristics of a mud not to employ an amount of treating agent or agents in excess of the minimum amount necessary to obtain the desired performance characteristics. If the quantity of reagent exceeds this minimum amount in any great excess the mud may be deleteriously affected. Normally the reagents are added in relatively small proportions in the order of about 0.01% to 2.0% by weight based upon the weight of drilling fluid treated. By the application of the above described tests it may readily be determined what the necessary amount of any given reagent or reagents is for any mud.

In the practice of this invention in the field, the treating agents may be conveniently added to the circulating mud stream at a point adjacent to the mud pump suction inlet in the mud sump. Thorough admixture of the thus introduced treating agents may be assured by rapid recirculation of the mud from the mud sump through a spare slush pump. During treatment, mud samples may be taken from the circulating mud stream at frequent intervals and tested in order to determine when the desired degree of treatment has been effected.

The following examples are presented in the nature of illustrations of the practical value of the processes of the invention and are not to be construed as limiting the invention in any sense.

A Santa Maria Valley clay was mixed with water to give a fluid weighing 78.5 pounds per cubic foot. To a given volume of this fluid was added an equal volume of water in which had been dispersed a treating agent as shown and the viscosity and filtration rate were determined on each sample by the procedures already described. The data from these several experiments are given in the following tabulations:

|   | Treating Agent Added, Percent by Weight of the Final Drilling Fluid | March Viscosity 500/500, Secs. | Filtration Rate, Ml. 1st 15 Min. |
|---|---|---|---|
| A | No added treating agent | 20 | 34.5 |
| B | 2.0% Petronate | 22 | 3.5 |
| C | 2.0% Petronate<br>0.4% Methyl cellulose | 24 | 2.0 |
| D | 0.7% Hydrated cement | 22 | 44.0 |
| E | 0.7% Hydrated cement<br>2.0% Petronate | 22 | 10.0 |
| F | 0.7% Hydrated cement<br>2.0% Petronate<br>0.4% Methyl cellulose | 24 | 3.0 |
| G | 10.0% Phenol extract, (stream #)<br>3.0% Petronate | 30 | 0.7 |

Example A shows that an untreated Santa Maria Valley clay and water suspension possesses an acceptable viscosity, but allows a high filtration rate. The addition of 2.0% by weight of Petronate gave a drilling fluid having acceptable performance characteristics (Example B). However, even better performance characteristics were obtained by using a combination of Petronate with methyl cellulose as is shown by Example C. Example D shows that cement has an extremely undesirable effect upon a Santa Maria Valley clay and water suspension. However, the addition of 2.0% Petronate to the drilling fluid is capable of offering improvement, Example E. The examples also show that in the presence of cement even better results are obtainable if the Petronate is used in combination with methyl cellulose (Example F).

Other modifications of this invention which would occur to one skilled in the art may be made, and these are to be considered within the scope of the invention as defined in the following claims.

We claim:

1. An aqueous drilling fluid having improved water loss characteristics comprising water, clay, a treating agent selected from the group consisting of the alkali metal and ammonium salts of petroleum mahogany sulfonic acids in a minor proportion not greater than about 2% by weight sufficient to reduce the water loss to a value not greater than about 45 ml. in the first hour of filtration, and a petroleum oil in a minor amount of at least about 10% by weight sufficient to substantially reduce the foaming character of the drilling fluid.

2. A drilling fluid according to claim 1 in which the amount of the petroleum oil is about 11% by weight.

3. A drilling fluid according to claim 1 in which the treating agent is a sodium salt.

4. A drilling fluid adapted to lose only small amounts of water to the formation being drilled, which comprises an emulsion of soap, hydrocarbon oil, suspending agent and water, the soap being selected from the group consisting of the alkali metal and ammonium salts of oil-soluble sulfonic acids and being present in an amount not greater than about 2% by weight sufficient to reduce the water loss to a value not greater than about 45 ml. in the first hour of filtration, and the hydrocarbon oil being present in an amount sufficient to substantially reduce the foaming character of the drilling fluid.

5. A drilling fluid according to claim 4 in which the amount of oil is at least about 11.2% by weight.

6. A drilling fluid which comprises water, clay, about 1.8% by weight of the sodium salt of petroleum mahogany sulfonic acids, and about 11.2% by weight of oil.

7. An oil-in-water emulsion drilling fluid consisting essentially of oil, a dispersed clay, 0.04 to 7.7 pounds per barrel of said drilling fluid of a salt selected from the group consisting of the alkali metal and ammonium salts of oil-soluble sulfonic acids, and water, the oil being present in an amount sufficient to substantially reduce the foaming character of the drilling fluid.

8. A drilling fluid according to claim 7 in which the oil is present in an amount of at least about 13.7% by volume.

References Cited in the file of this patent

UNITED STATES PATENTS

| | | |
|---|---|---|
| 2,568,992 | Doscher | Sept. 25, 1951 |
| 2,679,748 | Fischer et al. | May 25, 1954 |
| 2,713,032 | Tailleur | July 12, 1955 |